(12) United States Patent
Grier et al.

(10) Patent No.: US 8,922,857 B2
(45) Date of Patent: Dec. 30, 2014

(54) OPTICAL SOLENOID BEAMS

(75) Inventors: David G. Grier, New York, NY (US);
Sang-Hyuk Lee, Rego Park, NY (US);
Yohai Roichman, Tel Aviv (IL)

(73) Assignee: New York University, New York, NY (US)

( * ) Notice: Subject to any disclaimer, the term of this patent is extended or adjusted under 35 U.S.C. 154(b) by 84 days.

(21) Appl. No.: 13/424,203

(22) Filed: Mar. 19, 2012

(65) Prior Publication Data
US 2012/0281263 A1     Nov. 8, 2012

Related U.S. Application Data

(60) Provisional application No. 61/454,398, filed on Mar. 18, 2011.

(51) Int. Cl.
| G03H 1/00 | (2006.01) |
| G02B 5/32 | (2006.01) |
| H01S 1/00 | (2006.01) |
| G03H 1/22 | (2006.01) |
| G03H 1/08 | (2006.01) |

(52) U.S. Cl.
CPC .............. *G02B 5/32* (2013.01); *G03H 1/0808* (2013.01); *G03H 1/2294* (2013.01); *G03H 2001/0077* (2013.01)
USPC .................................. 359/1; 359/15; 250/251

(58) Field of Classification Search
None
See application file for complete search history.

(56) References Cited

U.S. PATENT DOCUMENTS

2002/0132316 A1 * 9/2002 Wang et al. ................ 435/173.9

FOREIGN PATENT DOCUMENTS

EP     1466509     * 10/2004    .......... G02B 21/32

OTHER PUBLICATIONS

Ashkin et al., "Observation of a single-beam gradient force optical trap for dielectric particles", *Optics Letters*, May 1986, pp. 288-290, vol. 11. No. 5, Optical Society of America.
Durnin, J., "Exact-solutions for nondiffracting beams. 1. The scalar theory", *J. Opt. Soc. Am. A*, Apr. 1987, pp. 651-654, vol. 4, No. 4, Optical Society of America.
Durnin, et al., "Diffraction-free beams", *Phys. Rev. Lett.*, Apr. 13, 1987, pp. 1499-1501, vol. 58, No. 15, The American Physical Society.
Tervo et al., "Rotating scale-invariant electromagnetic fields", *Opt. Express*, Jul. 2, 2001, pp. 9-15, vol. 9, No. 1, Optical Society of America.
Roichman, et al. "Optical forces arising from phase gradients", *Phys. Rev. Lett.*, Jan. 11, 2008, pp. 013602-1-013602-4, vol. 100, The American Physical Society.
Goodman, J. W., *Introduction to Fourier Optics*, $2^{nd}$ ed., (1996), McGraw-Hill, New York.
Roichman et al., "Projecting extended optical traps with shape-phase holography", *Opt. Lett.*, Jun. 1, 2006, pp. 1675-1677, vol. 31, No. 11, Optical Society of America.
Vasara et al., "Realization of general nondiffracting beams with computer-generated holograms", *J. Opt. Soc. Am. A*, Nov. 1989, pp. 1748-1754, vol. 6, No. 11, Optical Society of America.

(Continued)

*Primary Examiner* — Jade R Chwasz
(74) *Attorney, Agent, or Firm* — Foley & Lardner LLP (57) ABSTRACT

Optical solenoid beams, diffractionless solutions of the Helmholtz equation whose diffraction-limited in-plane intensity peak spirals around the optical axis, and whose wavefronts carry an independent helical pitch. The solenoid beams have the noteworthy property of being able to exert forces on illuminated objects that are directed opposite to the direction of the light's propagation. Optical solenoid beams therefore act as true tractor beams that are capable of transporting material back toward their source.

16 Claims, 3 Drawing Sheets

(56) References Cited

OTHER PUBLICATIONS

Overfelt, P. L., "Scalar optical beams with helical symmetry", *Physical Review A*, Sep. 15, 1992, pp. 3516-3522, vol. 46, No. 6, The American Physical Society.

Arlt et al., "Optical micromanipulation using a Bessel light beam", *Optics Communications*, Oct. 1, 2001, pp. 239-245, vol. 197, Elsevier Science B.V.

Chavez-Cerda, et al., "Nondiffracting beams: travelling, standing, rotating and spiral waves", *Optics Communications*, Jan. 15, 1996, pp. 225-233, vol. 123, Elsevier Science B.V.

Kotlyar et al., "An algorithm for the generation of laser beams with longitudinal periodicity: rotating images", *Journal of Modern Optics*, (1997), pp. 1409-1416, vol. 44, No. 7, Taylor & Francis Ltd.

Pääkönen et al., "Rotating optical fields: experimental demonstration with diffractive optics", *Journal of Modern Optics*, (1998), pp. 2355-2369, vol. 45, No. 11, Taylor & Francis Ltd.

Bouchal et al., "Controllable 3D spatial localization of light fields synthesized by non-diffracting modes", *Journal of Modern Optics*, (2004), pp. 157-176, vol. 51, No. 2. Taylor & Francis Ltd.

Courtial et al., "Iterative algorithms for holographic shaping of non-differacting and self-imaging light beams", *Opt. Express*, (2006), pp. 2108-2116, vol. 14, Optical Society of America.

Dufresne et al., "Optical tweezer arrays and optical substrates created with diffractive optics", *Review of Scientific Instruments*, May 1998, pp. 1974-1977, vol. 69, No. 5, American institute of Physics.

Grier, David G., "A revolution of optical manipulation", *Nature*, Aug. 14, 2003, pp. 810-816, vol. 424, www.nature.com/nature.

Polin et al., "Optimized holographic optical traps", *Optics Express*, Jul. 25, 2005, pp. 5831-5845, vol. 13, No. 15, Optical Society of America.

Lee et al., "Robustness of holographic optical traps against phase scaling errors", *Optics Express*, Sep. 19, 2005, vol. 13, No. 19, Optical Society of America.

Roichman et al., "Volumetric imaging of holographic optical traps", *Optics Express*, Oct. 30, 2006, vol. 14, No. 22, Optical Society of America.

Crocker et al., "Methods of digital video microscopy for colloidal studies", *Journal of Colloid and Interface Science*, (1996) pp. 298-310, vol. 179, Academic Press, Inc.

Garces-Chavez et al., "Simultaneous micromanipulation in multiple planes using a self-reconstructing light beam", *Nature*, Sep. 12, 2002, vol. 419, www.nature.com/nature.

Cizmar et al., "Sub-micron particle organization by self-imaging of non-diffracting beams," *New Journal of Physics*, (2006), pp. 1-23, vol. 8, No. 43, IOP Publishing LTD and Deutsch Physikalische Gesellschaft.

\* cited by examiner

OPTICAL SOLENOID BEAMS

CROSS-REFERENCE TO RELATED APPLICATIONS

This application claims priority from U.S. Provisional Application 61/454,398, filed Mar. 18, 2011, and is incorporated herein by reference in its entirety.

STATEMENT OF GOVERNMENT INTEREST

The United States Government has rights in the invention described herein pursuant to National Science Foundation Grant Number DMR-0855741.

BACKGROUND OF THE INVENTION

Radiation pressure due to the momentum flux in a beam of light drives illuminated objects along the direction of the light's wave vector. Additional forces arising from intensity gradients tend to draw small objects toward extrema of the intensity. These forces are exploited in single-beam optical traps known as optical tweezers, which capture microscopic objects at the focus of a strongly converging beam of light. Stable three-dimensional trapping results when axial intensity gradients are steep enough that the intensity-gradient force overcomes radiation pressure downstream of the focus. The beam of light in a tightly focused optical tweezer therefore has the remarkable property of drawing particles upstream against radiation pressure, at least near its focal point. Collimated beams of light generally have no axial intensity gradients, and therefore are not considered able to exert such retrograde forces.

SUMMARY OF THE INVENTION

One embodiment of the invention relates to a method for manipulating an object comprising generating a collimated beam of light, the beam of light having a frequency ω propagating along the $\hat{z}$ direction. Then an optical force is exerted comprising intensity-gradient localization and phase-gradient driving on an object. In one embodiment, the optical force has a vector substantially opposite the direction of the light beam's propagation causing the object to be moved upstream relative to the light beam.

In one embodiment the invention relates to a system for exerting retrograde forces comprising a light source configured to provide a linearly polarized beam of light. A spatial light modulator is provided in communication with the light source and configured to imprint a hologram associated with a selected wavefront profile, $u_{y,z}(r)$ onto the wavefronts of the linearly polarized beam of light. An optical component is configured to project the hologram into the far field. The linearly polarized beam of light has a principal intensity maximum which spirals around an optical axis and further having wavefronts characterized by an independent helical pitch.

In one embodiment the invention relates to a computer-implemented machine for manipulating an object. The computer implemented machine includes a processor and a tangible computer-readable medium operatively connected to the processor and including computer code configured to provide instructions to the machine. The computer code provides instructions to modify the wavefronts of a separately provided collimated beam of light, the beam of light having a frequency ω propagating along the $\hat{z}$ direction; the modified beam exerts optical forces comprising intensity-gradient localization and phase-gradient driving on an object. The optical force includes a vector component substantially opposite the direction of the light beam's propagation causing the object to be moved upstream relative to the direction of propagation of the light beam. Such an optical solenoid beam therefore acts as a tractor beam, a traveling wave that can transport material back to its source without requiring additional actions to be taken beyond projecting the beam.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIGS. 2(a)-2(c) illustrate retrograde forces in a helical solenoid beam wherein the local wave vector k is normal to the light's wavefronts, with a component in the $\hat{z}$ direction; FIG. 2(a) l=+40: k is directed along the solenoid, resulting in a downstream phase-gradient force; FIG. 2(b)=0: Wavefronts are parallel to the solenoid so that k is everywhere normal to the spiral and particles trapped by intensity-gradient forces experience no net force; FIG. 2(c) l_=−40: A component of k is directed back down the spiral such that a particle confined to the spiral therefore moves upstream.

DETAILED DESCRIPTION OF THE PREFERRED EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Figure 1:
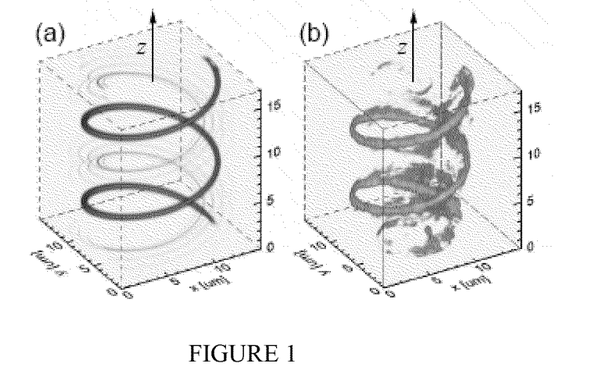
FIG. 1(a) illustrates calculated three-dimensional intensity distribution of a solenoid beam propagating in the $\hat{z}$ direction.
FIG. 1(b) illustrates volumetric rendering of the measured intensity in an experimental realization.

The present invention provides a system and methods for producing and utilizing optical solenoid beams capable of exerting retrograde forces. In one embodiment, optical solenoid beams are provided whose principal intensity maximum spirals around the optical axis and whose wavefronts are characterized by an independent helical pitch. FIG. 1 shows theoretical and experimentally realized examples. These beams are solutions of the Helmholtz equation ($\nabla^2 A + k^2 A = 0$), and thus propagate without diffraction, their radial intensity profiles remaining invariant in the spiraling frame of reference. Intensity gradients in a solenoid beam tend to draw small objects such as colloidal particles toward the one-dimensional spiral of maximum intensity. Radiation pressure directed by the beam's phase gradients then can drive the particle around the spiral. The combination of intensity-gradient localization and phase-gradient driving can create a component of the total optical force directed opposite to the light's direction of propagation, which can pull matter upstream along the beam's entire length. The vector potential for a beam of light at frequency $\omega$ propagating along the $\hat{z}$ direction may be written as $$A(r,z,t) = u(r,z) e^{-i\omega t} \hat{\epsilon} \qquad (1)$$

where $k = \omega/c$ is the wave number of the light, $\hat{\epsilon}$ is its polarization vector and r measures the two-dimensional displacement from the beam's axis. The three-dimensional optical solenoid field $u(r,z)$ is derived by considering the two-dimensional field $u_0(r)$ in the plane, $z=0$. Because the light propagating to $z>0$ must first pass through the plane $z=0$, the field in this plane completely specifies the beam. Moreover, a featureless beam imprinted with the complex field $u_0(r)$ in the plane $z=0$ will propagate into the far field as $u(r,z)$. In this sense, $u_0(r)$ may be considered the hologram encoding the desired beam.

Quite generally, $u_0(r)$ may be obtained from $u(r, z)$ by formally back-propagating the three-dimensional field to $z=0$. This can be accomplished in scalar diffraction theory with the Rayleigh-Sommerfeld formula, $$u_0(r) = \int (u \otimes h_{-z})(r) dz \text{ where} \qquad (2)$$

$$h_z(r) = -\frac{1}{2\pi} \frac{\partial}{\partial z} \left( \frac{e^{ik\sqrt{r^2+z^2}}}{\sqrt{r^2+z^2}} \right) \qquad (3)$$

is the Rayleigh-Sommerfeld propagator, and where the convolution is given by $$(u \otimes h_{-z})(r) = \int u(r^1, z) h_{-z}(r-r^1) d^2 r^1 \qquad (4)$$

It should be appreciated that, in one embodiment, this formalism can be useful even if the desired field, $u(r, z)$, is not a solution of the Helmholtz equation, and so does not describe a physically realizable beam of light. In that case, the physical beam, $u_p(r, z)$, associated with $u(r, z)$ can be obtained by propagating $u_0(r)$ forward, again using the Rayleigh-Sommerfeld propagator, $$u_p(r,z) = (u_0 \otimes h_z)(r) \qquad (5)$$

Those solutions for which $|u_p(r,z)|^2$ is independent of z are said to be non-diffracting.

The formalistic approach described above can be utilized to design beams of light whose intensity maxima trace out specified one-dimensional curves in three dimensions, with arbitrary amplitude and phase profiles along these curves. Such beams may be represented as:

$$u(r, z) = \begin{cases} a(z)\delta(r - r_0(z)) e^{i\varphi(z)}, & z_1 \leq z \leq z_2 \\ 0, & \text{otherwise} \end{cases} \qquad (6)$$

Here, $r_0(z)$ is the position of the beam's maximum at axial position z, $a(z)$ is its amplitude, and $\phi(z)$ is its phase. This representation does not describe a physically realizable beam of light because it neither incorporates self-diffraction nor locally conserves energy or momentum. Equations (2) through (5) nevertheless yield a physically realizable beam that has the desired properties along $r_0(z)$, provided that self-diffraction may be neglected.

Equation (4) is most easily computed with the Fourier convolution theorem. In that case, the two-dimensional Fourier transform of $u_0(r)$ is $$\tilde{u}_0(q) = \int_{A_z}^{z_2} a(z) e^{i\phi(z)} a - iq \cdot r_0(z) e - iz(k^2 - Q^2)^{1/2} dz \qquad (7)$$

An inverse Fourier transform then provides $u_0(r)$, and Eq. (5) yields the associated beam of light. This result extends to three dimensions the previously described two-dimensional holographic line traps and holographic ring traps in the plane.

In one embodiment, a first step toward deriving the solenoid beam is consideration of the case of an infinite line of light propagating along the optical axis, $r_0(z)=0$, with uniform amplitude, $a(z)=1$, but with a specified axial phase gradient, $\phi(z) = \beta z$. For $0 \leq \beta \leq k$, Eq. (7) has solutions:

$$u_0(r) = \beta J_0((k^2 - \beta^2)^{1/2} r) \qquad (8)$$

and $u_p(r,z) = u_0(r) \exp(i\beta z)$ which is the zeroth-order Bessel beam. Although this defines an effectively infinitesimally finely resolved thread of light, formal back-propagation with Eq. (7) implicitly accounts for the beam's self-diffraction. The limit $\beta = k$ corresponds to a plane wave propagating along $\hat{z}$. Smaller values of $\beta$ yield more finely resolved beams that carry less momentum along $\hat{z}$.

In one embodiment, to create a solenoid beam, the following are set: $a(z)=1$ and $r_0(z) = R \cos(\Theta_o(z))\hat{x} + R \sin(\Theta_0(z))\hat{y}$, where $\Theta_0(z) = z/\gamma$ is the azimuthal angle around the optical axis in a spiral of radius R and pitch $\gamma$. In addition to establishing a spiral structure for the beam's principal intensity maximum, a helical phase profile in the plane is imposed, $\phi(z) = l\Theta_0(z)$, where the helical pitch, l, is independent of $\gamma$. In one embodiment, this helical phase profile will enable the exertion of tunable phase-gradient forces along the solenoid.

As for the Bessel beam, in one embodiment a non-diffracting solution of Eq. (7) is utilized, such as through integration over all z to obtain:

$$u_{\gamma,l}(r, z) = \sum_{m=[l-\gamma k]}^{l} \frac{l-m}{\gamma^2} J_m(q_m R) e^{i\frac{l-m}{\gamma} z} e^{im\Theta} J_m(q_m r) \qquad (9)$$

where $q_m^2 = k^2 - (l-m)^2/\gamma^2$ and where [x] is the integer part of x. The solenoid beam thus is a particular superposition of m-th order Bessel beams. Superposition of non-diffracting modes previously has been used to synthesize multi-lobed spiral and localized modes. More generally, Eq. (9) is a particular example of a rotating scale-invariant electromagnetic field.

FIG. 1(a) shows the three-dimensional intensity distribution r computed according to Eq. (9) for kR=10, $\Theta$=30° and l=10. As intended, the locus of maximum intensity spirals around the optical axis.

The intensity distribution of a solenoid depends on z, and so is not strictly invariant under propagation. Nonetheless, the in-plane intensity distribution remains invariant, merely rotating about the optical axis. Such a generalization of the notion of non-diffracting propagation previously was introduced in the context of spiral waves. Solenoid beams therefore may be considered to be non-diffracting in this more general sense.

In one embodiment, distinct solenoid beams satisfy the orthogonality condition:

$$\int u_{\gamma l'm'}(r,z) u_{\gamma l}(r,z) d^2 r dz = \delta_{ll'} \delta(\gamma'-\gamma) \qquad (10)$$

except if $m \equiv (l\gamma'-l'\gamma)/(\gamma'-\gamma)$ is an integer that falls in the range $[\max(1-\gamma k, l'-\gamma' k)] \leq [\min(l, l')]$. This additional condition defines classes of m-congruent solenoid beams whose members are not mutually orthogonal and results from the solenoid modes' non-trivial periodicity along the optical axis.

Figure 2:
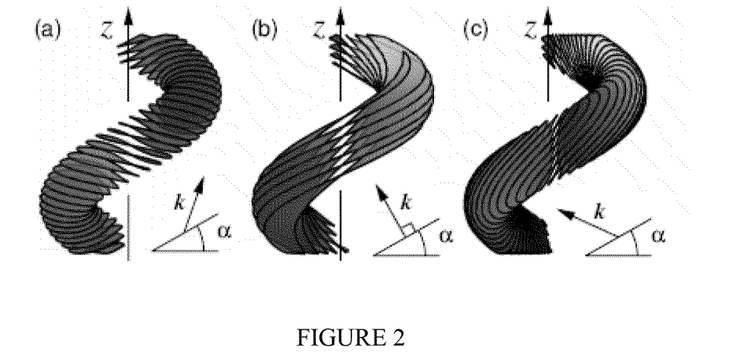

In one embodiment, the helicity of the solenoid beam is altered to impact the wavefronts and, thus, the direction of particle movement. FIG. 2 shows the effect of changing the helicity of a solenoid beam with a fixed spiral pitch, $\alpha = \tan^{-1}(\gamma k)$. When $l>0$, as in FIG. 2(a), the wave vector is directed along the solenoid, i.e., there is a downstream phase-gradient force. A particle confined to the spiral by intensity-gradient forces therefore is driven downstream by this component of the radiation pressure. Changing l does not alter $\alpha$, but changes the wavefronts' pitch relative to $\hat{z}$. As shown in FIG. 2(b), at l=0, the wavefronts are parallel to the solenoid's pitch. In this case, radiation pressure is directed normal to the spiral, and so can be balanced by intensity-gradient forces. Particles trapped by intensity-gradient forces experience no net force. Setting l<0 tilts the wavefronts in the retrograde direction, as shown in FIG. 2(c). The resulting reverse-sense phase-gradient force can move the particle upstream along the spiral in the negative $\hat{z}$ direction. This condition therefore enables a optical solenoid beam to act as a tractor beam, conveying illuminated material back toward its source.

EXAMPLES

Solenoid beams were projected using methods developed for holographic optical trapping. In this system, a phase-only liquid crystal spatial light modulator (SLM) (Hamamatsu X7690-16 PPM) was used to imprint the hologram $u_0(r)$ associated with $u_{\gamma,l}(r)$ onto the wavefronts of a linearly polarized laser beam with a vacuum wavelength $\lambda = 532$ nm (Coherent Verdi). This hologram then was projected into the far field with a microscope objective lens (Nikon Plan Apo, 100×, oil immersion) mounted in a conventional inverted optical microscope (Nikon TE 2000U). The computed complex hologram was encoded on the phase-only SLM using the shape-phase holography algorithm. The resulting beam included the intended solenoid mode superposed with higher diffraction orders.

To visualize the projected beam, a front-surface mirror was mounted on the microscope's stage. The reflected light was collected by the objective lens and relayed to a CCD camera (NEC TI-324AII). Images acquired at a sequence of focal depths then were combined to create a volumetric rendering of the three-dimensional intensity field. The example in FIG. 1(b) shows the serpentine structure of a holographically projected solenoid beam with R=5 μm.

To demonstrate the solenoid beam's ability to exert retrograde forces on microscopic objects, it was projected into a sample of colloidal silica spheres 1.5 μm in diameter dispersed in water. The sample was contained in the 50 μm thick gap between a glass microscope slide and a glass number 1 cover slip, and was mounted on the microscope's stage. Bright-field images of individual spheres interacting with the solenoid beam were obtained with the same objective lens used to project the hologram, and were recorded by the video camera at 1/30 s intervals. The sphere's appearance changes as it moves in z in a manner that can be calibrated to measure the particle's axial position. Combining this with simultaneous measurements of the particle's in-plane position yields the three-dimensional trajectory data that are plotted in FIG. 3. The gray-scale image in FIG. 3 was created by superimposing six snapshots of a single sphere that was trapped on a solenoid beam and moving along its length. This illustrates how the sphere's image changes as it moves in z.

Figure 3:
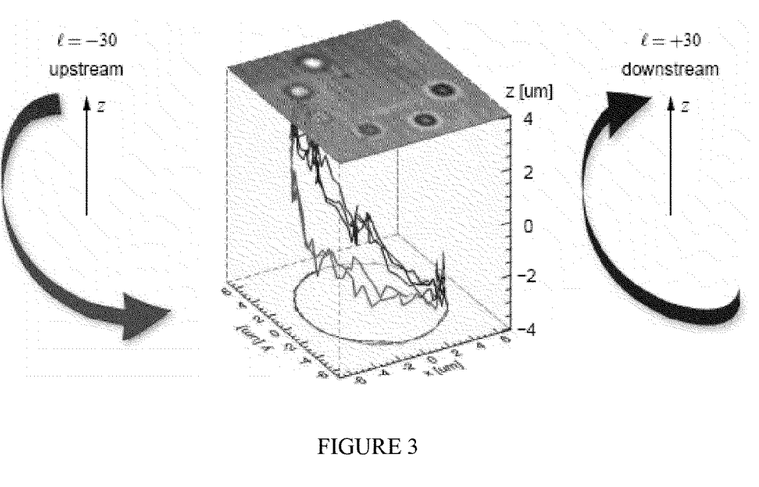
FIG. 3 illustrates three-dimensional trajectory of a colloidal sphere moving along one turn of an optical solenoid beam together with a multiply-exposed image of the sphere at six points in its motion alternating between l=±30 switches the direction of the particle's motion relative to the propagation direction, $\hat{z}$. Light grey lines trace the trajectory of the upstream while dark lines trace the downstream trajectory. Arrows indicate the direction of motion for the downstream (right) and retrograde upstream (left) trajectories.

The data plotted in FIG. 3 were obtained by alternately setting l=+30 and l=−30 without changing any other properties of the solenoid beam. The three blue traces show trajectories obtained with l=+30 in which the particle moved downstream along the curve of the solenoid, advancing in the direction of the light's propagation. These alternate with two red traces obtained with l=−30 in which the particle moves back upstream, opposite to the direction of the light's propagation. These latter traces confirm that the combination of phase— and intensity-gradient forces in helical solenoid beams can exert retrograde forces on illuminated objects and transport them upstream over large distances.

Although in one embodiment, the solenoid beam was designed to be uniformly bright, the article does not move along it smoothly in practice. Interference between the holographically projected solenoid beam and higher diffraction orders creates unintended intensity variations along the solenoid that tend to localize the particle. These unintended intensity variations may be minimized by designing the hologram to direct the intended solenoid beam away from the direction of the higher-order beams. They also may be minimized using standard methods of adaptive optics to minimize the intensity of higher diffraction orders.

Although in one embodiment, the solenoid beam was projected using a computer-addressable spatial light modulator, the hologram required to create an optical solenoid beam also may be created with a static diffractive optical element, such as a microfabricated diffractive optical element.

Although in one preferred embodiment, the solenoid beam is created from a single Gaussian input beam using a single diffractive optical element, an equivalently functional optical solenoid beam can be created according to the prescription of Equation (9) by forming an appropriate superposition of Bessel beams using such conventional optical elements as axicons to create the Bessel beams, and beam splitters to combine them. Other equivalent methods for creating such superpositions of beams are commonly known in the art.

The foregoing results introduce solenoidal beams of light whose non-diffracting transverse intensity profiles spiral periodically around the optical axis and whose wavefronts can be independently inclined through specified azimuthal phase profiles. Solenoid beams of the present invention can trap microscopic objects in three dimensions and that phase-gradient forces can be used to transport trapped objects not only down the optical axis but also up. The ability to balance radiation pressure with phase-gradient forces in solenoidal beams opens a previously unexplored avenue for single-beam control of microscopic objects. In principle, solenoid beams can transport objects over large distances, much as do Bessel beams and related nondiffracting modes, without the need for high-numerical-aperture optics. Solenoid beams, moreover, offer the additional benefit of bidirectional transport along the optical axis with the direction of transport selected with the choice of the sign of l.

Figure 4:
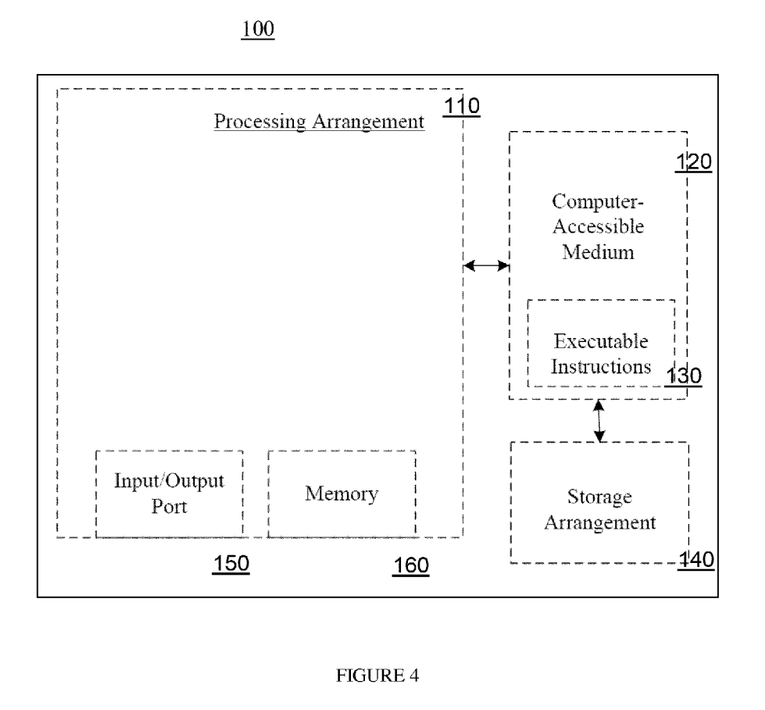
FIG. 4 illustrates one embodiment of a computerized system for implementing optical solenoid beams.

In one embodiment, shown in FIG. 4, a system 100 is provided for generating and or controlling solenoid beams as described. FIG. 4 shows an exemplary block diagram of an exemplary embodiment of a system 100 according to the present disclosure. For example, an exemplary procedure in accordance with the present disclosure can be performed by a processing arrangement 110 and/or a computing arrangement 110. Such processing/computing arrangement 110 can be, e.g., entirely or a part of, or include, but not limited to, a computer/processor that can include, e.g., one or more microprocessors, and use instructions stored on a computer-accessible medium (e.g., RAM, ROM, hard drive, or other storage device).

As shown in FIG. 4, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. A computer-implemented machine for manipulating an object, comprising:
   a processor; and
   a tangible computer-readable medium operatively connected to the processor and including computer code configured to control:
   generation of a beam of light, the beam of light having a frequency ω propagating along the $\hat{z}$ direction; and
   exertion of an optical force of the beam of light comprising intensity-gradient localization and phase-gradient driving on an object;
   wherein the optical force has a vector component substantially opposite the direction of the light beam's propagation causing the object to be moved upstream relative to the light beam.

2. The computer-implemented machine of claim 1, wherein the exerted optical force drives the object about a spiral path centered about an optical axis of the beam of light.

3. The computer-implemented machine of claim 1, wherein the generated beam of light has a vector potential defined as $A(r,z,t) = u(r,z)e^{-i\omega t}$, where ω is the frequency of the light where $k=\omega/c$ is the wave number of the light c, r is the two-dimensional displacement from the optical axis of the beam of light, z is the location along the optical axis, $\hat{\epsilon}$ and is its polarization vector.

4. The computer-implemented machine of claim 1, wherein a complex amplitude profile of the generated beam of light is described by $$u_{\gamma,l}(r,z) = \sum_{m=\lceil l-\gamma k \rceil}^{l} \frac{l-m}{\gamma^2} J_m(q_m R) e^{i\frac{l-m}{\gamma}z} e^{im\Theta} J_m(q_m r)$$

where l is an integer known as a winding number that controls the helicity of the light beam's wavefronts, γ describes the pitch of the light beam's spiral intensity profile, R is the radius of the spiral, θ is the azimuthal angle around the optical axis, and $$q_m = \sqrt{k^2 - \frac{(l-m)^2}{\gamma^2}}.$$

5. The computer-implemented machine of claim 1, further including computer code configured to control altering helicity of the generated beam of light to impact wavefronts of the beam of light.

6. The computer-implemented machine of claim 5, wherein computer code configured to control the altering of the helicity further comprises computer code configured to control changing the pitch of wavefronts relative to the $\hat{z}$ direction.

7. The computer-implemented machine of claim 6, further including computer code configured to control selecting a direction of movement of the object between the group comprising prograde and retrograde with respect to the $\hat{z}$ direction.

8. The computer-implemented machine of claim 1, wherein the beam of light is a collimated beam of light.

9. A nontransitory computer-readable memory having instructions thereon, the instructions comprising:
   instructions for generation of a beam of light, the beam of light having a frequency ω propagating along the $\hat{z}$ direction; and
   instructions for exertion of an optical force of the beam of light comprising intensity-gradient localization and phase-gradient driving on an object;
      wherein the optical force has a vector component substantially opposite the direction of the light beam's propagation causing the object to be moved upstream relative to the light beam.

10. The nontransitory computer-readable memory of claim 9, wherein the instructions for exertion of an optical force further comprise instructions for an exerted optical force to drive the object about a spiral path centered about an optical axis of the beam of light.

11. The nontransitory computer-readable memory of claim 9, wherein the generated beam of light has a vector potential defined as $A(r,z,t)=u(r,z)e^{-iwt}$, where $k=\omega/c$ is the wave number of the light, $\hat{\epsilon}$ is its polarization vector and r measures the two-dimensional displacement from the beam of light's optical axis.

12. The nontransitory computer-readable memory of claim 9, wherein a complex amplitude profile of the generated beam of light is described by $$u_{\gamma,l}(r,z) = \sum_{m=[l-\gamma k]}^{l} \frac{l-m}{\gamma^2} J_m(q_m R) e^{i\frac{l-m}{\gamma}z} e^{im\Theta} J_m(q_m r).$$

where l is an integer known as a winding number that controls the helicity of the light beam's wavefronts, γ describes the pitch of the light beam's spiral intensity profile, R is the radius of the spiral, θ is the azimuthal angle around the optical axis, and $$q_m = \sqrt{k^2 - \frac{(l-m)^2}{\gamma^2}}.$$

13. The nontransitory computer-readable memory of claim 9, further comprising instructions for altering helicity of the generated beam of light to impact wavefronts of the beam of light.

14. The nontransitory computer-readable memory of claim 13, wherein the instructions for the altering of the helicity further comprises instructions for controlling changing the pitch of wavefronts relative to the $\hat{z}$ direction.

15. The nontransitory computer-readable memory of claim 9, further comprising instructions to control selecting a direction of movement of the object between the group comprising prograde and retrograde with respect to the $\hat{z}$ direction.

16. The nontransitory computer-readable memory of claim 9, wherein the beam of light is a collimated beam of light.

\* \* \* \* \*

UNITED STATES PATENT AND TRADEMARK OFFICE
CERTIFICATE OF CORRECTION

PATENT NO. : 8,922,857 B2
APPLICATION NO. : 13/424203
DATED : December 30, 2014
INVENTOR(S) : David G. Grier et al.

It is certified that error appears in the above-identified patent and that said Letters Patent is hereby corrected as shown below:

In The Claims

Claim 4, Line 60, please change

" $u_{y,l}(r,z) = \sum_{m=-[l-\gamma k]}^{l} \frac{l-m}{\gamma^2} J_m(q_m R) e^{i\frac{l-m}{\gamma}z} e^{im\Theta} J_m(q_m r)$ " with -- $u_{y,\ell}(r,z) = \sum_{m=-[\ell-\gamma k]}^{\ell} \frac{\ell-m}{\gamma^2} J_m(q_m R) e^{i\frac{\ell-m}{\gamma}z} e^{im\Theta} J_m(q_m r)$ --.

Claim 4, Line 3, please change " $q_m = \sqrt{k^2 - \frac{(l-m)^2}{\gamma^2}}$ " with -- $q_m = \sqrt{k^2 - \frac{(\ell-m)^2}{\gamma^2}}$ --.

Claim 12, Line 11, change " $u_{y,l}(r,z) = \sum_{m=-[l-\gamma k]}^{l} \frac{l-m}{\gamma^2} J_m(q_m R) e^{i\frac{l-m}{\gamma}z} e^{im\Theta} J_m(q_m r)$ " with -- $u_{y,\ell}(r,z) = \sum_{m=-[\ell-\gamma k]}^{\ell} \frac{\ell-m}{\gamma^2} J_m(q_m R) e^{i\frac{\ell-m}{\gamma}z} e^{im\Theta} J_m(q_m r)$ --.

Claim 12, Lines 22-23, change " $q_m = \sqrt{k^2 - \frac{(l-m)^2}{\gamma^2}}$ " with -- $q_m = \sqrt{k^2 - \frac{(\ell-m)^2}{\gamma^2}}$ --.

Signed and Sealed this
Fourteenth Day of April, 2015

Michelle K. Lee
*Director of the United States Patent and Trademark Office*